United States Patent [19]
Maki et al.

[11] Patent Number: 5,692,485
[45] Date of Patent: Dec. 2, 1997

[54] FEEDBACK CONTROL SYSTEM USING ADAPTIVE CONTROL

[75] Inventors: Hidetaka Maki; Yusuke Hasegawa; Isao Komoriya; Yoichi Nishimura, all of Wako, Japan

[73] Assignee: Honda Giken Kogyo Kabushiki Kaisha, Tokyo, Japan

[21] Appl. No.: 401,430

[22] Filed: Mar. 9, 1995

[30] Foreign Application Priority Data

Mar. 9, 1994 [JP] Japan .................................. 6-066594

[51] Int. Cl.$^6$ ...................................... F02D 41/14
[52] U.S. Cl. .................................. 123/684; 123/694
[58] Field of Search .......................... 123/694, 684; 364/151, 431.05

[56] References Cited

U.S. PATENT DOCUMENTS

| | | | |
|---|---|---|---|
| 4,674,028 | 6/1987 | Shioya et al. | 364/157 |
| 4,922,412 | 5/1990 | Lane et al. | 364/157 |
| 5,335,643 | 8/1994 | Abate et al. | 123/679 |
| 5,462,037 | 10/1995 | Hasegawa et al. | 123/694 |
| 5,535,135 | 7/1996 | Bush et al. | 123/672 |

FOREIGN PATENT DOCUMENTS

| | | |
|---|---|---|
| 5-248286 | 9/1993 | Japan . |
| 6-17680 | 1/1994 | Japan . |

OTHER PUBLICATIONS

Shozo Fujii, "Digital Adaptive Control", Computrol No. 27, pp. 28–41. Jul. 10, 1989, Japan.

Suzuki et al., Automatic Control Handbook, pp. 703–707. Oct. 30, 1983, Japan.

*Primary Examiner*—Andrew M. Dolinar
*Attorney, Agent, or Firm*—Nikaido Marmelstein Murray & Oram LLP

[57] ABSTRACT

An air/fuel ratio feedback control system with the adaptive controller. The adaptive controller has a system parameter estimator which identifies system parameters such that the error between the desired value and the controlled variable outputted from the plant decreases to zero. In the system, a basic fuel injection amount is determined at a feedforward system. The adaptive controller is placed outside of the basic fuel injection amount determining system and receives the desired value (air/fuel ratio) and the controlled value (detected air/fuel ratio) using the system parameters etc. The calculated feedback coefficient is multiplied to the basic fuel injection amount to determine a final injection amount to be supplied to the plant (engine). Variables necessary for the system parameter calculation are limited their change of range so as to make the controller to be realized on a low performance computer with a small word length.

30 Claims, 16 Drawing Sheets

FEEDBACK CONTROL SYSTEM USING ADAPTIVE CONTROL

BACKGROUND OF THE INVENTION

1. Field of the Invention

This invention relates to a feedback control system using adaptive control, more specifically to a feedback control system with an adaptive controller for controlling the air/fuel ratio etc. in an internal combustion engine which determines a feedback correction coefficient such that the controlled variable becomes identical to the desired value.

2. Description of the Prior Art

Conventionally, a PID controller is widely used in feedback control. In the control the proportional gain, integral gain and the derivative gain are respectively manipulated to reduce the error between the desired value and the controlled variable (to determine the integral term and the like corresponding thereto) and the resultant terms are then summed to determine the feedback correction coefficient. A PI controller or some such other controller of a simpler structure is often used.

If the controlled object which changes is the one whose state change results in the change in desirable convergence speed, the PID controller needs considerable time to correct the error. When using an air/fuel ratio feedback control for an internal combustion engine as an example, therefore, it was difficult to immediately solve a lean spike or a rich spike problem. For that reason, a prior art air/fuel ratio feedback correction control system prepared the feedback coefficient in advance as mapped data and retrieved it using engine parameters such as the engine speed and the engine load and determined the feedback correction coefficient in a shorter period. In the control it is therefore necessary to accurately prepare the mapped data for respective engine operating regions. The accurate setting of the data was, however, quite difficult. It needed quite a bit of time to determine the data through experiments.

A feedback control system using the state feedback method is taught in Japanese Laid-open Patent Application No. Hei 5(1993)-248286. In the system, an internal combustion engine is modeled and a state variable indicative of engine torque, for example, is estimated by an observer. Specifically, since it is considered not easy to accurately model the dynamics of an internal combustion engine, a tuning gain is determined in response to the operating condition of the engine and using the tuning gain the engine model is identified.

A feedback correction coefficient is then determined based on the identified engine model and the state variable is estimated by the observer. The estimated state variable is then multiplied by the feedback gain to perform the state feedback such that the system follows the change, if one occurs, of the controlled object. In particular, control coefficients are identified at respective engine operating regions and are stored to be used as the initial value at the next control cycle, thereby enhancing convergency speed.

In the prior art system, however, the system merely receives the input to and the output from the controlled object (engine) to identify (tune) the model and based on the identified model, it determines the state variable and the feedback gain, multiplies them with each other and then multiplies the product with the desired value as the manipulated variable to be inputted into the controlled object. In other words, since the prior art system merely uses, instead of a PID controller, the state feedback controllers it is not satisfactory in convergency speed.

Aside from the above, there has been proposed an evaporative emission control system to transfer fuel vapors from the fuel tank to an activated carbon (charcoal) canister so that fuel vapors do not generate HC (hydrocarbons). The fuel vapors are trapped and are purged to the intake system in response to the engine operating condition. At present it is hard to exactly measure the amount of purge, more specifically the amount of HC supplied to the intake system. The purged gas thus becomes a disturbance for fuel metering control in an internal combustion engine, causing lean or rich spikes at engine transients.

Therefore, from the standpoint of not only enhancing the convergence, but also improving exhaust gas purification, such a control has long been waiting. One that is able not only to solve the lean or rich spikes, but solve them without delay. However, the prior art system performs poorly against disturbances and is hence insufficient in the convergence. Good performance against disturbances is desired in any feedback control including the fuel metering or air/fuel ratio control in an internal combustion engine.

Therefore, an object of the invention is to provide a feedback control system which can adaptively make the controlled variable equal to the desired value, enhancing the convergence speed.

A second object of the invention is to provide a feedback control system which can adaptively make the controlled variable equal to the desired value, improving the resiliency to disturbances.

A third object of the invention is to provide a feedback control system which makes it unnecessary to have mapped feedback gain or coefficient data which are intrinsically intended for varying the convergency performance in response to the state of the controlled object.

A fourth object of the invention is to provide an air/fuel ratio control system for an internal combustion engine which can make the detected air/fuel ratio equal to the desired air/fuel ratio so as to enhance the convergency speed and additionally to enhance the performance against disturbances.

Aside from the above, it is desirable to realize the feedback control system using the adaptive control on a low performance computer with a small word length.

A fifth object of the invention is therefore to provide a feedback control system using the adaptive control which can be realized on a low performance computer with a small word length.

SUMMARY OF THE INVENTION

For realizing these objects, the present invention provides a system for controlling a plant, comprising controlled variable determining means for measuring an output of said plant to determine a controlled variable, manipulated variable determining means for determining a manipulated variable to be supplied to said plant, an adaptive controller with a system parameter estimator which estimates system parameter such that an error between said controlled variable and a desired value decreases to zero, said adaptive controller calculating a feedback correction coefficient at least using said system parameters, and correcting means for correcting said manipulated variable by said feedback correction coefficient.

BRIEF EXPLANATION OF THE DRAWINGS

These and other objects and advantages of the invention are explained in the following description and drawings, in which.

DETAILED DESCRIPTION OF THE PREFERRED EMBODIMENTS

Embodiments of the invention are explained below with reference to the drawings.

Figure 1:
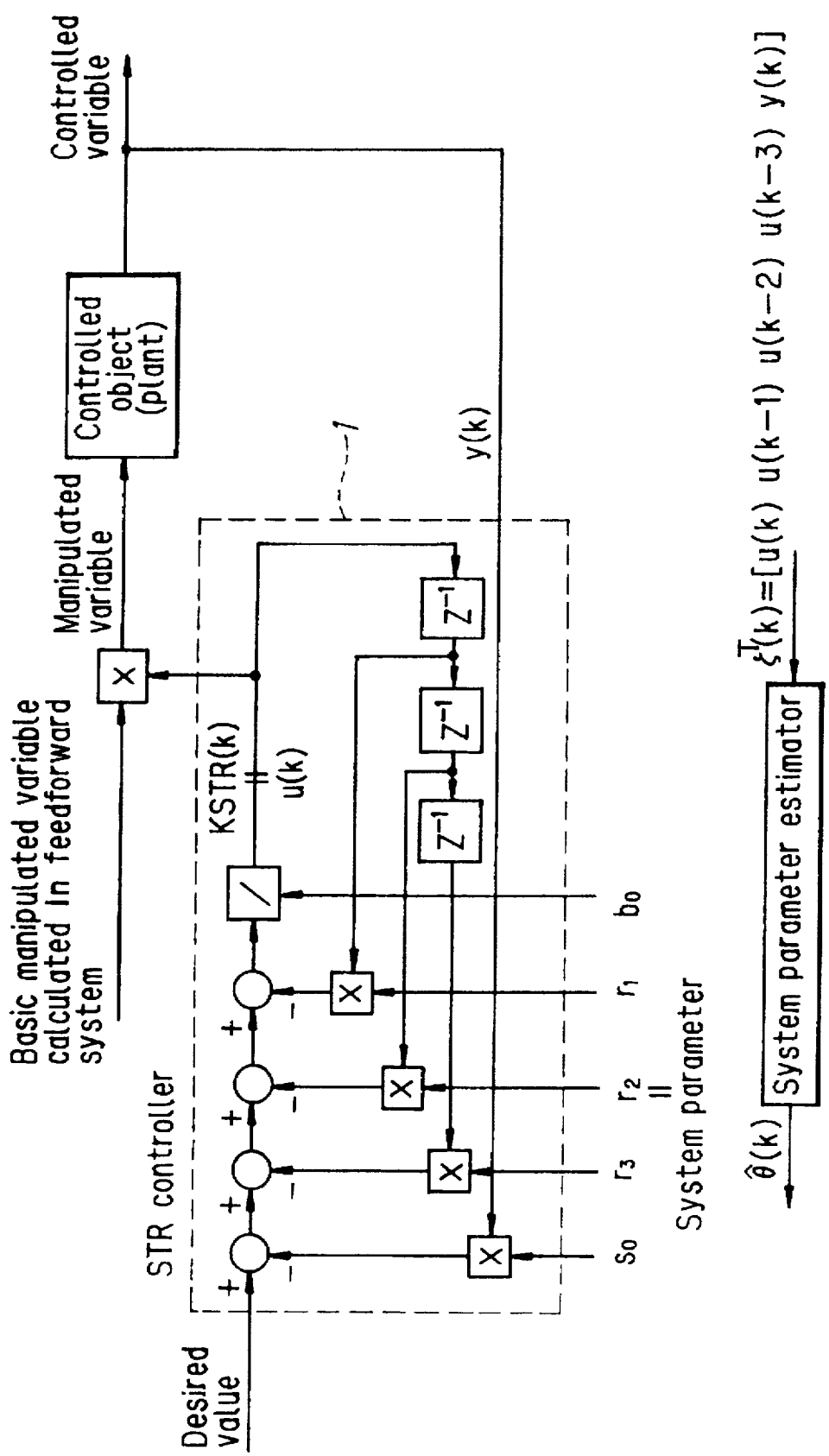
FIG. 1 is a block diagram showing the feedback control system using the adaptive control according to the invention mainly focusing on the adaptive controller thereof.

FIG. 1 is an overall schematic view of a feedback control system according to the invention.

As illustrated, the feedback control system is provided with an adaptive controller 1 made up of a STR controller (self-tuning regulator), which receives a desired value in a feedback system and a controlled variable y(k) and calculates a feedback coefficient (named KSTR(k)) using a recurrence formula. The STR controller receives a system parameters (expressed in a vector form) $\hat{\theta}$ estimated or identified by a system parameter estimator. The STR controller is thus designated as a feedback compensator.

The adaptive controller uses the parameter estimation or adjustment law expressed in recurrence formula which is proposed by I. D. Landau et al. The proposed technique converts the adaptive system into an equivalent feedback system comprised of a linear block and a non-linear block. The estimation or adjustment law is determined such that the non-linear block satisfies Popov's integral inequality with respect to the input-output relationship, whereas the linear block is strictly positive real, thereby ensuring the system stability. The technique was mentioned in, for example, "CONPUTROL" (Corona Publishing Co., Ltd) No. 27., pages 28 to 41, or in "AUTOMATIC CONTROL HANDBOOK" (Ohm Publishing Co., Ltd.) pages 703 to 707 and is well-known.

In the adaptive control, the scalar $\hat{b}_0^{-1}(k)$, the element $\hat{B}R(Z^{-1},k)$ using the manipulated variable and another element $\hat{S}(Z^{-1},k)$ are respectively expressed as Equation 1 to Equation 3.

$$\hat{b}_0^{-1}(k)=1/b_0 \qquad \text{Eq. 1}$$

$$\hat{B}R(Z^{-1},k)=r_1z^{-1}+r_2z^{-2}+\ldots+r_{m+d-1}z^{-(m+d-1)}=r_1z^{-1}+r_2z^{-2}+r_3z^{-3} \qquad \text{Eq. 2}$$

$$\hat{S}(Z^{-1},k)=s_0+s_1z^{-1}+\ldots+s_{n-1}z^{-(n-1)}=s_0 \qquad \text{Eq. 3}$$

Here, m, n: the order of the numerator and the denominator of a transfer function of the plant and d: delay time expressed in terms of combustion cycles. In the embodiment, they are set as m=1, n=1 and d=3. The second line of Equations 2 and 3 are substituted with these numbers. The embodiment is thus explained, as an example, with reference to the plant of a first order system with 3 combustion cycles' delay time.

The system parameter estimator estimates, adjusts or identifies respective coefficients of the scalar and elements along the manner shown by I. D. Landau et al and supplies the results to the STR controller. They are expressed in a lump by the system parameters $\hat{\theta}(k)$, which is expressed generally as Equation 4.

$$\hat{\theta}(k)=\hat{\theta}(k-1)+\Gamma(k-1)\zeta(k-d)e^*(k) \qquad \text{Eq. 4}$$

The system parameter estimator estimates or adjusts the system parameters $\hat{\theta}$ using the manipulated variable u(i) input to the plant and the controlled variable y(j) including past values thereof, each expressed in vector form, such that the error between the desired value and the controlled variable decreases to zero.

In Equation 4, zeta means a parameter necessary for calculation in the system parameter estimator and in the embodiment. It is set as shown in FIG. 1 based on the aforesaid example of m=1, n=1 and d=3. e*(k) is the performance function or index which evaluates the error and $\Gamma(k)$ is the gain matrix which determines the adaptive (convergency) speed of the STR controller. They are expressed as Equations 5 and 6.

$$e^*(k) = \frac{D(Z^{-1})y(k) - \theta^T(k-1)\zeta(k-d)}{1+\zeta^T(k-d)\Gamma(k-1)\zeta(k-d)} \qquad \text{Eq. 5}$$

$$\Gamma(k) = \frac{1}{\lambda 1(k)}\left[\Gamma(k-1) - \frac{\lambda^2(k)\Gamma(k-1)\zeta(k-d)\zeta^T(k-d)\Gamma(k-1)}{\lambda^1(k)+\lambda^2(k)\zeta^T(k-d)\Gamma(k-1)\zeta(k-d)}\right]$$

Where:

$$0<\lambda1(k)\leq1,\ 0<\lambda2(k)<2,\ \Gamma(0)>0 \qquad \text{Eq. 6}$$

Based on the selection of lambda 1 and lambda 2 in the gain matrix $\Gamma(k)$ in Equation 6, one algorithm is selected.

For example, lambda 1(k)=1, lambda 2(k)=0 gives the constant-gain algorithm; lambda 1(k)=1, lambda 2(k)= lambda (0<lambda<2) gives the gradually-decreasing-gain algorithm (when lambda=1, least squares method); lambda 1(k)=lambda 1 (0<lambda 1<1) and lambda 2(k)=lambda 2 (0<lambda 2<lambda) gives the variable-gain algorithm (when lambda 2=1, weighted least squares method). Moreover, using lambda 3 defined in a manner not shown and setting lambda 1/lambda 2=rho gives constant-trace algorithm. All of the algorithms are suitable for a time-varying plant including the air/fuel ratio control which will be discussed later.

The characteristic feature in the configuration shown in FIG. 1 is that the desired value in a feedback system is inputted into the STR controller. At the same time, the output measurement y(k) from the plant is inputted into the STR controller and based on them, the STR controller calculates the feedback correction coefficient KSTR(k) in the manner stated in Equation 7.

$$KSTR(k) = \frac{KCMD(k-d') - s_0 \times y(k) - r_1 \times KSTR(k-1) - r_2 \times KSTR(k-2) - r_3 \times KSTR(k-3)}{b_0}$$ Eq. 7

Here, d' means the specific delay time d until the desired air/fuel ratio KCMD is reflected to the measured value KACT. In other words, KCMD(k–d') was the desired value corresponding to the measured KACT at the delay time (control cycles) earlier.

The calculated feedback coefficient is multiplied with the manipulated variable and the resultant product is inputted to the plant.

With this arrangement, when any disturbance is found in the measurement of the controlled variable, the system parameter estimator operates such that the controlled variable converges to the desired value. The convergency speed is greatly enhanced when compared with the prior art control system taught in Japanese Laid-open Patent Application Hei 5(1993)-248286 and a known PID control system. Moreover, even when a disturbance enters the manipulated variable, the system parameter estimator operates such that the controlled variable converges to the desired value, enhancing the performance against said disturbances.

It should be noted that although the feedback coefficient is calculated as a multiplication term, it can be calculated as an addition term.

Figure 2:
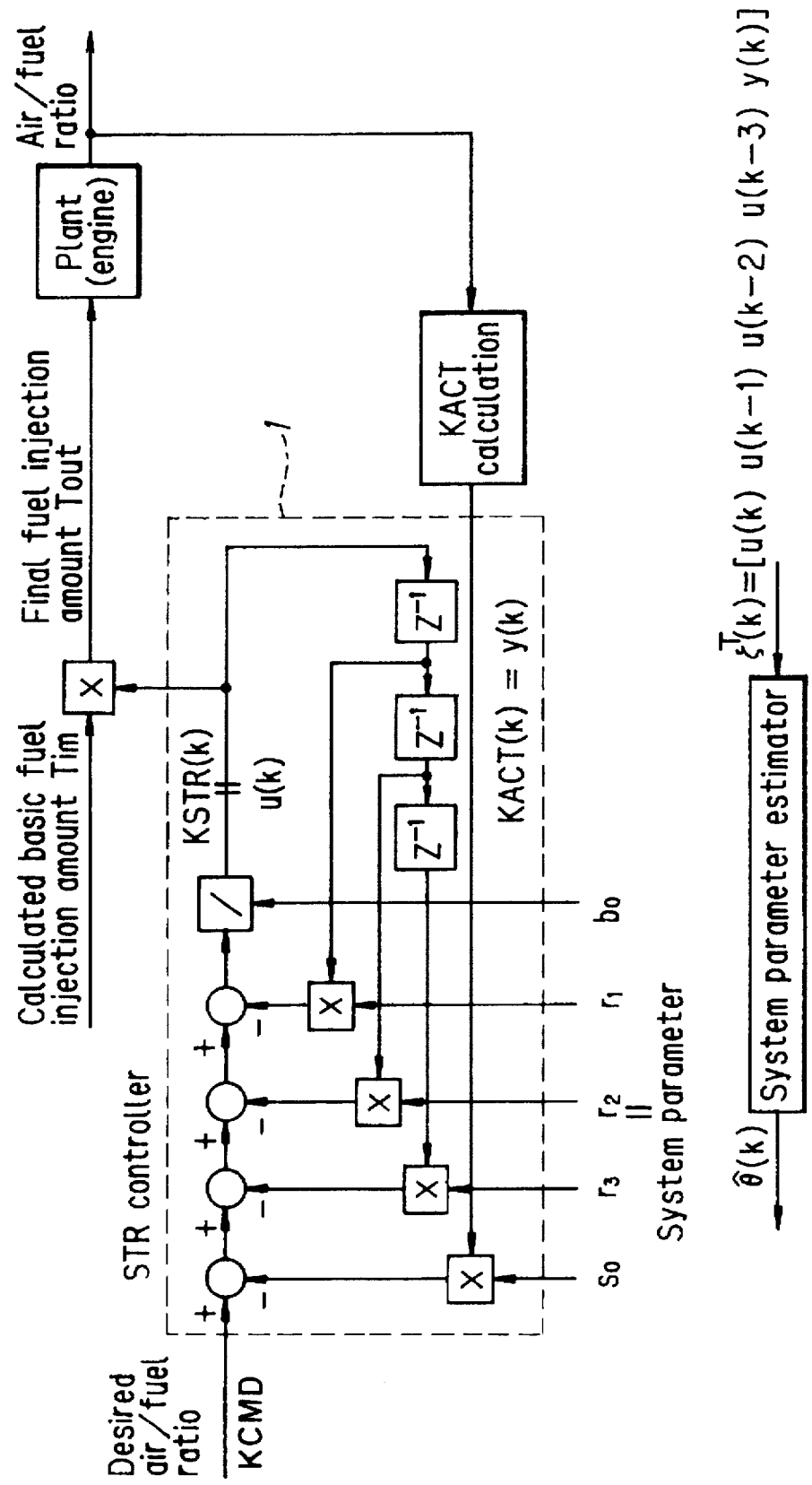
FIG. 2 is a block diagram showing the air/fuel ratio feedback control system for an internal combustion engine according to a second embodiment of the invention mainly focusing on the adaptive controller thereof.

FIG. 2 shows a second embodiment of the invention, wherein the configuration of FIG. 1 is applied to an air/fuel ratio control of an internal combustion engine.

Figure 3:
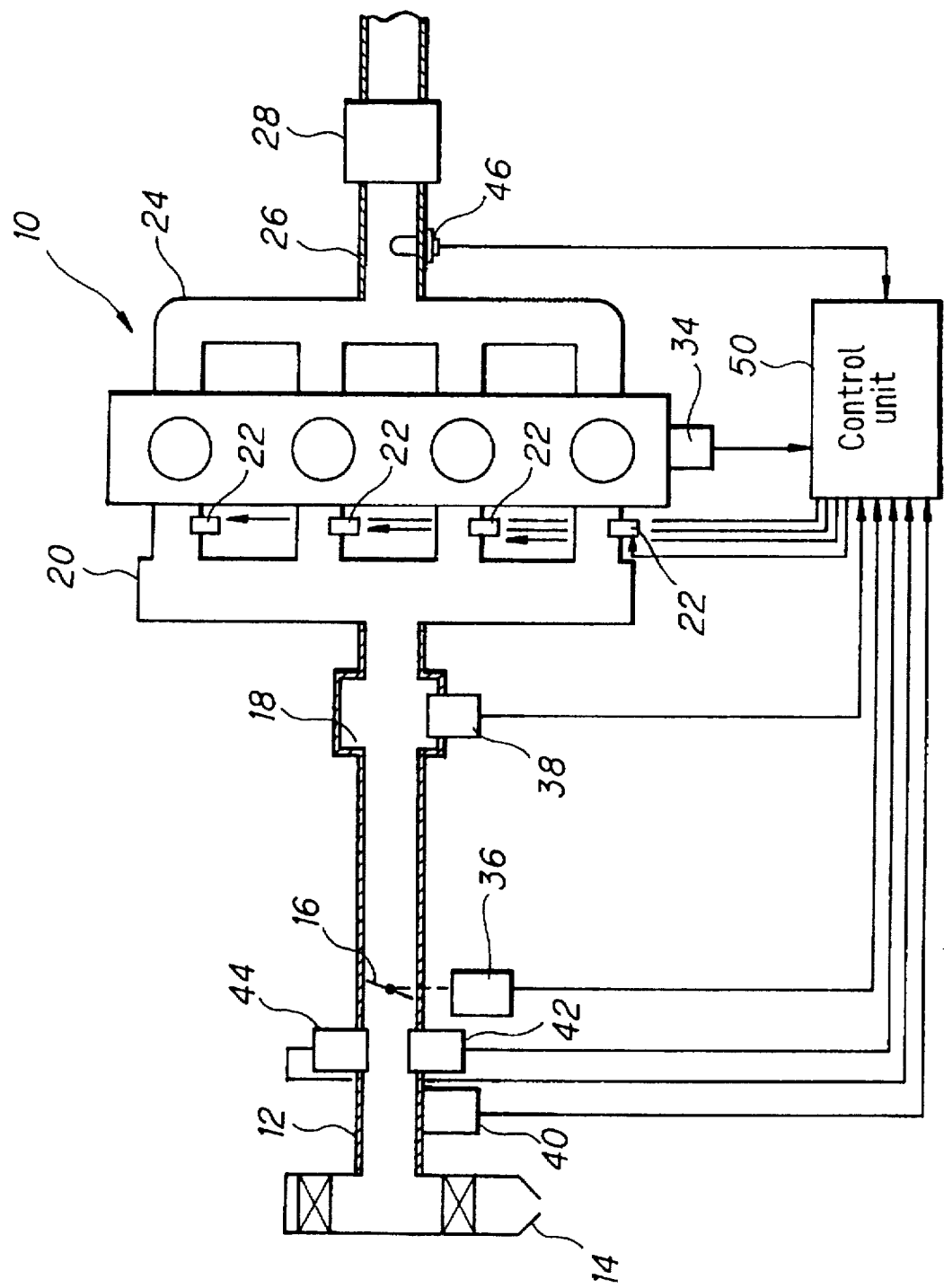
FIG. 3 is an overall schematic view of the system illustrated in FIG. 2.

Referring to FIG. 3 first, the air/fuel ratio feedback control system according to the second embodiment will be explained wholly.

Reference numeral 10 in this figure designates a four cylinder internal combustion engine. Air drawn in through an air cleaner 14 mounted on the far end of an air intake path 12 is supplied to the first through the fourth cylinders through a surge tank (chamber) 18 and an intake manifold 20 while the flow thereof is adjusted by a throttle valve 16. An injector 22 for injecting fuel is installed in the vicinity of the intake valve (not shown) of each cylinder. The injected fuel mixes with the intake air flow to form an air-fuel mixture that is introduced and ignited in the associated cylinder by a spark plug (not shown). The resulting combustion of the air-fuel mixture drives down a piston (not shown). The exhaust gas produced by the combustion is discharged through an exhaust valve (not shown) into an exhaust manifold 24, from where it passes through an exhaust pipe 26 to a three-way catalytic converter 28 where it is cleared of noxious components before being discharged into the atmosphere.

A crank angle sensor 34 for detecting the piston crank angles is provided in a distributor (not shown) of the internal combustion engine 10, a throttle position sensor 36 is provided for detecting the degree of opening θTH of the throttle valve 16, and a manifold absolute pressure sensor 38 is provided for detecting the absolute pressure Pb of the intake air downstream of the throttle valve 16. The upstream side of the throttle valve 16 is provided with an atmospheric pressure sensor 40 for detecting the atmospheric (barometric) pressure Pa, an intake air temperature sensor 42 for detecting the temperature of the intake air and a hygrometer 44 for detecting the humidity of the intake air. An air/fuel ratio sensor 46 comprised of an oxygen concentration detector is provided in the exhaust system at a point downstream of the exhaust manifold 24 and upstream of a three-way catalytic converter 28, where it detects the air/fuel ratio of the exhaust gas. The outputs of the sensor 34 etc. are sent to a control unit 50.

Figure 4:
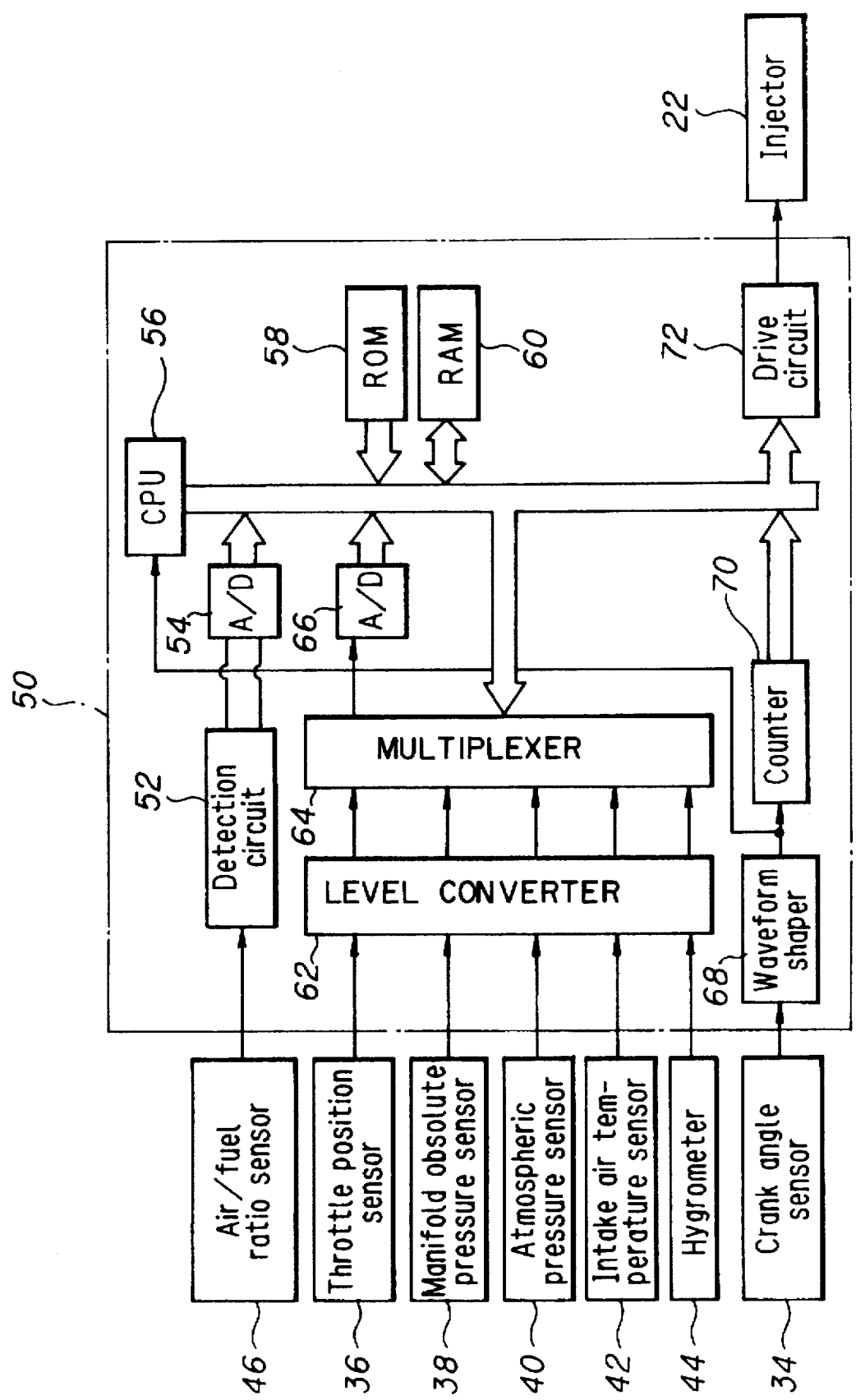
FIG. 4 is a block diagram showing the detail of a control unit illustrated in FIG. 3.

Details of the control unit 50 are shown in the block diagram of FIG. 4. The output of the air/fuel ratio sensor 46 is received by a detection circuit 52 of the control unit 50, where it is subjected to appropriate linearization processing to obtain an air/fuel ratio characterized in that it varies linearly with the oxygen concentration of the exhaust gas over a broad range extending from the lean side to the rich side. The output of the detection circuit 52 is forwarded through an A/D (analog/digital) converter 54 to a microcomputer comprising a CPU (central processing unit) 56, a ROM (read-only memory) 58 and a RAM (random access memory) 60 and is stored in the RAM 60. Similarly, the analog outputs of the throttle position sensor 36 etc. are inputted into the microcomputer through a level converter 62, a multiplexer 64 and a second A/D converter 66, while the output of the crank angle sensor 34 is shaped by a waveform shaper 68 and has its output value counted by a counter 70, the result of the count being inputted into the microcomputer. In accordance with commands stored in the ROM 58, the CPU 56 of the microcomputer computes a control value in the manner to be explained later and drives the injector 22 of the individual cylinders via a drive circuit 72.

In the configuration of the second embodiment shown in FIG. 2, there is provided an adaptive controller 1 made of the STR controller, same as the first embodiment, which receives the desired value and the controlled variable of a feedback control system and calculates a feedback coefficient (the aforesaid KSTR(k)) using the recurrence formula. In the embodiment, the desired value is an air/fuel ratio named KCMD. In order to be multiplied with the manipulated variable (fuel injection amount) as an air/fuel ratio correction coefficient to correct the same, the desired air/fuel ratio KCMD is expressed in terms of the relative air/fuel ratio which is the inverse of the equivalence ratio.

As just mentioned, the manipulated variable is a fuel injection amount (basic fuel injection amount Tim) and is multiplied with the feedback coefficient KSTR(k) and other correction coefficients including KCMD (as explained above) to determine a final fuel injection amount named Tout. The final fuel injection amount Tout is supplied to the engine and the oxygen in the resulting exhaust gas is detected through the air/fuel ratio sensor 46 to determine the air/fuel ratio named KACT. The system parameter estimator estimates the system parameter such that the measured value KACT becomes equal to the desired value KCMD.

Similarly to the first embodiment, the delay time d in the configuration of FIG. 2 is set to be the third order. In other words, the system can cope with 3 cycles's delay. Since the "cycle" is the combustion cycle of the first cylinder to the fourth cylinder and one cycle corresponds to 4 TDCs in a four cylinder engine, the system can cope with 12 TDC's delay.

Figure 5:
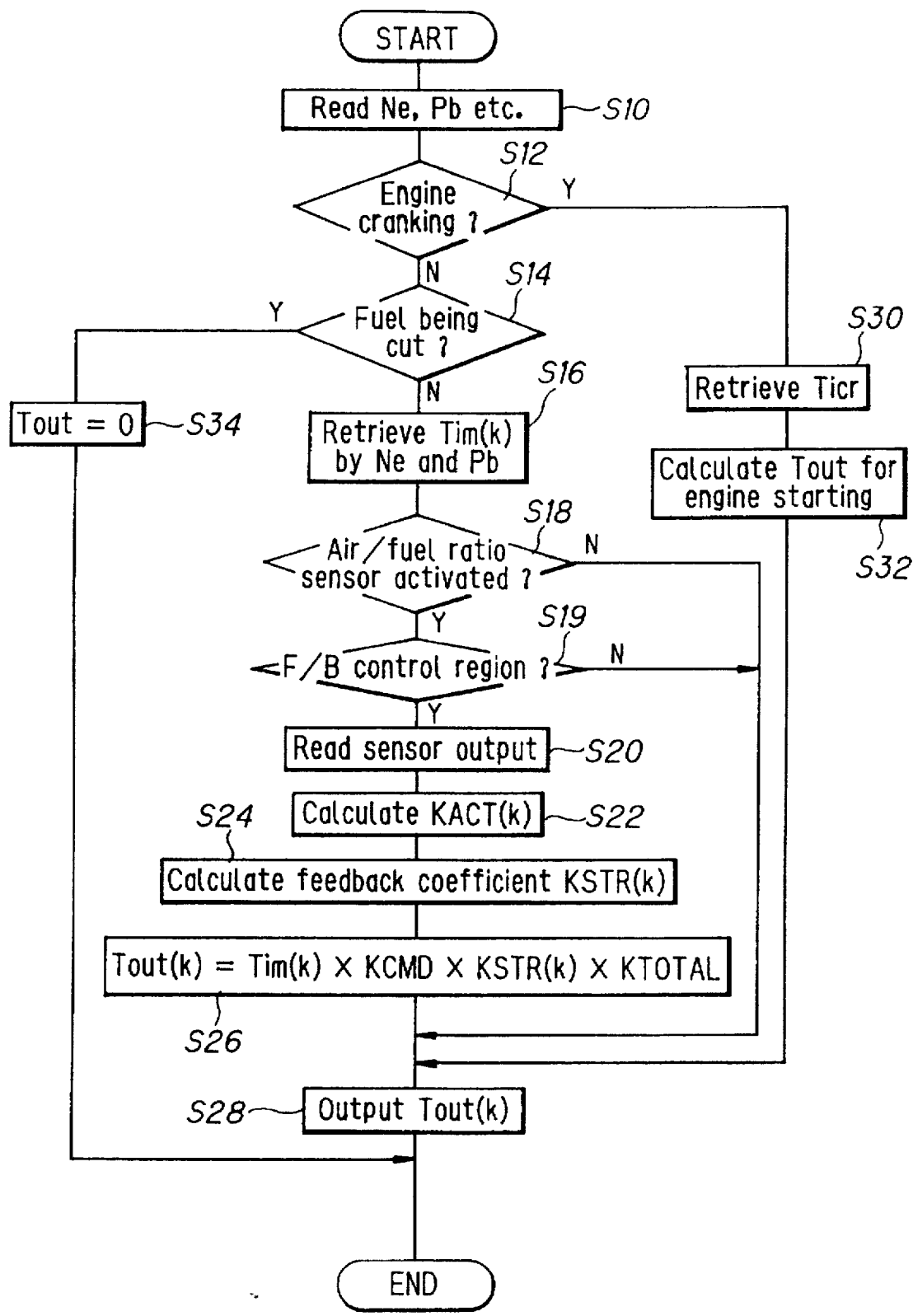
FIG. 5 is a flowchart showing the operation of the system illustrated in FIG. 2.

Based on the above, the operation of the system in the second embodiment will be explained with reference to FIG. 5. The program of this flowchart is activated at a determined crank angular position.

The program begins at step S10 in which the engine speed Ne, the manifold absolute pressure Pb and the like are read and proceeds to step S12 in which it is checked whether the engine is cranking, and if it is not, to step S14 in which it is determined whether the fuel supply has been cut off. If the result of the determination is negative, the program proceeds to step S16 in which a basic fuel injection amount Tim(k)(k: time) is calculated by retrieval from a map prepared beforehand using the engine speed Ne and the manifold absolute pressure Pb as address data.

The program then proceeds to step S18 in which it is checked whether the air/fuel ratio sensor 46 has been activated and if it has, to step S19 where it is checked whether the engine operation is at the feedback control region. Specifically, when the engine runs at high speed or when a fuel injection amount is increased at the wide-open throttle etc., the control is conducted in an open-loop manner.

If the result of step S19 is affirmative, the program moves to step S20 in which the sensor output is read, to step S22 in which the aforesaid exhaust air/fuel ratio KACT(k) is calculated, to step S24 in which the feedback correction coefficient KSTR(k) is calculated, to step S26 in which the basic fuel injection amount Tim(k) is multiplied by the air/fuel ratio correction coefficient KCMD (which is identical to the desired air/fuel ratio), the feedback correction coefficient KSTR(k) and other coefficient KTOTAL (KTOTAL: the product of the other correction coefficients including that for the engine coolant temperature Tw) to determine the final fuel injection amount Tout(k), to step S28 in which the determined final fuel injection amount Tout(k) is outputted to the injector 22 concerned.

On the other hand, when step S12 finds that cranking is in progress, the program advances to step S30 in which a fuel injection amount Ticr during cranking is calculated from the coolant water temperature Tw in accordance with prescribed characteristics, to step S32 in which the final fuel injection amount Tout is determined on the basis of a start mode equation (explanation omitted). When step S14 finds that the fuel supply has been cut off, the program moves to step S34 in which the final fuel injection amount Tout is set to zero. Moreover, when the decision in either step S18 or S29 is negative, the program jumps to step S28 in which the basic fuel injection amount Tim(k) is outputted to the injector.

With this arrangement, the desired air/fuel ratio KCMD and the output measurement (exhaust air/fuel ratio KACT) are inputted into the STR controller and it computes the feedback coefficient in response to the change in exhaust air/fuel ratio. As a result, when a sharp rich or lean spike occurs, it will immediately be removed. When a disturbance enters in the system due to the canister purge etc., the exhaust air/fuel ratio is immediately converged to the desired air/fuel ratio, improving emission performance.

Moreover, the desired air/fuel ratio is not changed frequently, especially when the desired value is the stoichiometric air/fuel ratio, it remains unchanged so that the control stability is enhanced.

It should be noted in the above that the air/fuel ratio sensor is installed at the confluence point of the exhaust system, and the control is conducted based on the single sensor output. However, the system can instead be configured to have a number of sensors located in the exhaust system equal to the number of cylinders to use their outputs for measuring the air/fuel ratios at the individual cylinders.

Figure 6:
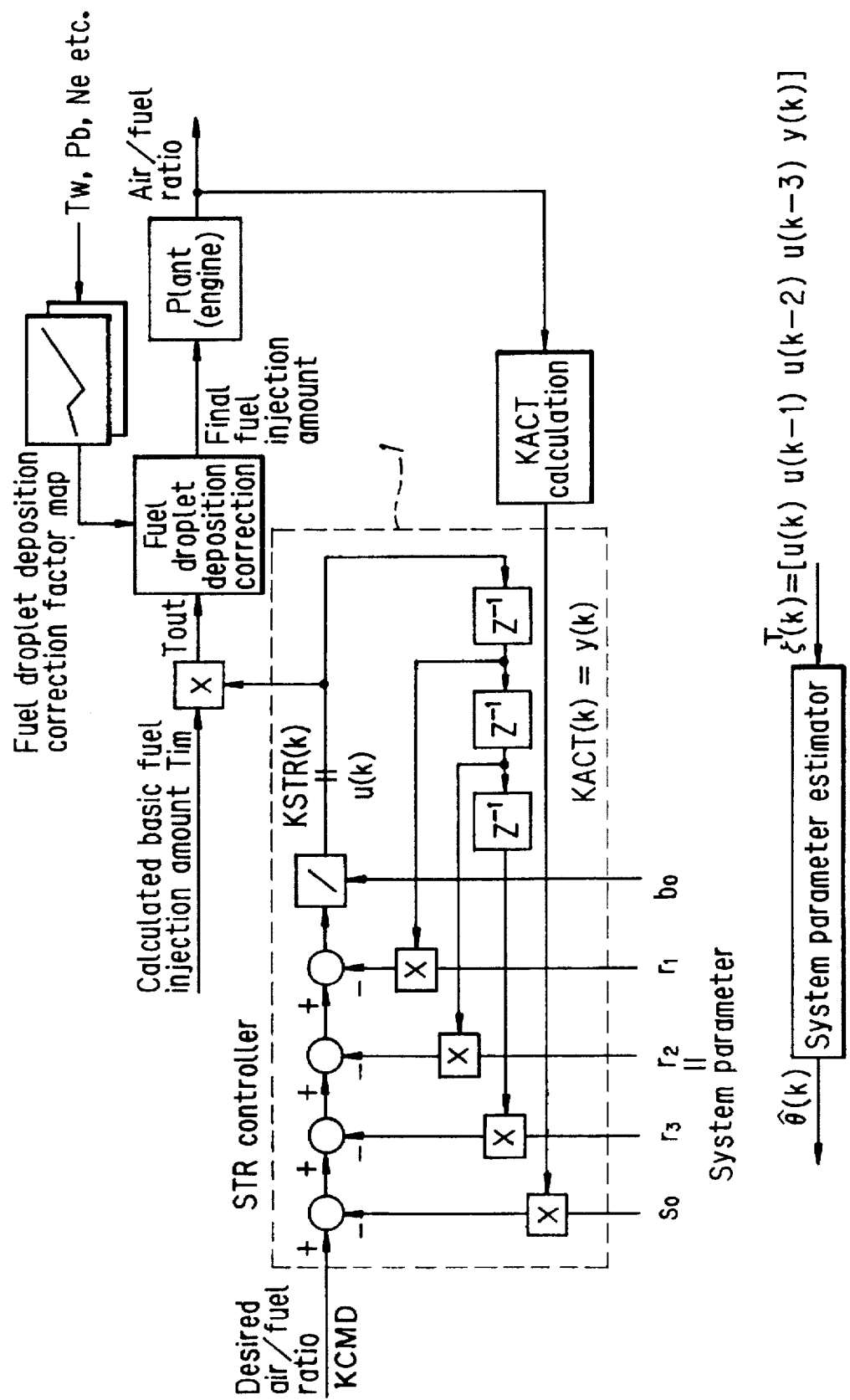
FIG. 6 is a block diagram showing the air/fuel ratio feedback control system for an internal combustion engine according to a third embodiment of the invention mainly focusing on the adaptive controller thereof.

FIG. 6 shows a third embodiment of the invention. The third embodiment is a modification of the second embodiment and includes correction of the fuel injection amount by fuel droplet deposition.

Figure 7:
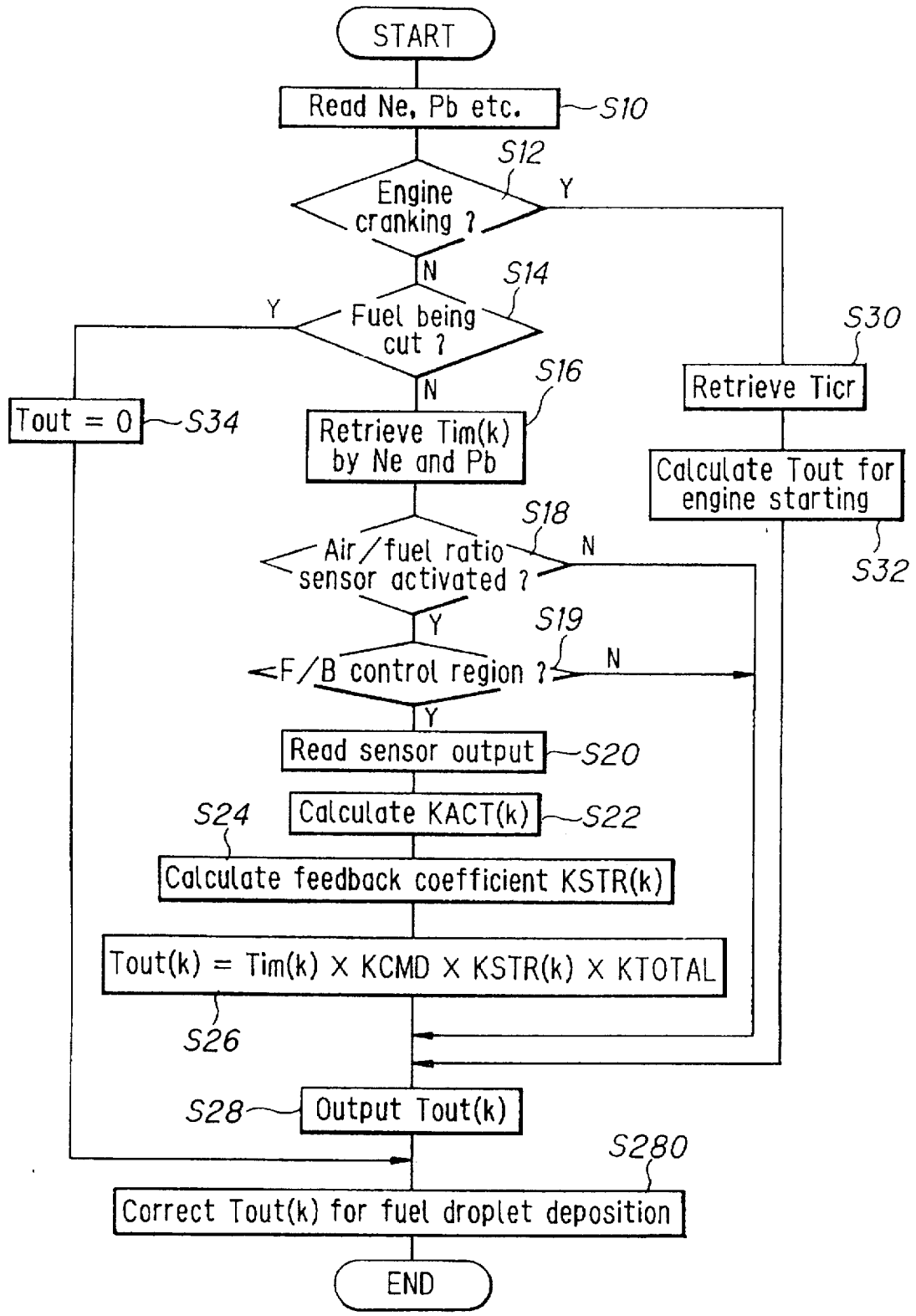
FIG. 7 is a flowchart showing the operation of the system illustrated in FIG. 6.

FIG. 7 is a flowchart showing the operation of the system of the third embodiment.

Figure 8:
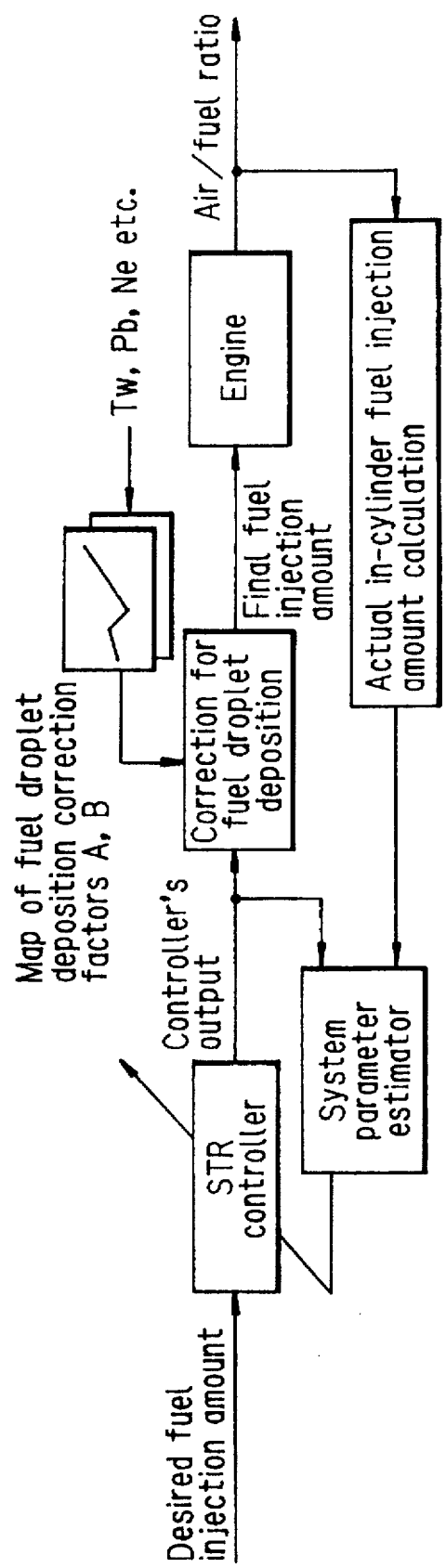
FIG. 8 is a block diagram showing the system earlier proposed by the assignee.

Before entering the explanation, however, the fuel droplet deposition correction will be stated with reference to FIG. 8.

FIG. 8 shows the configuration of the system with the fuel droplet deposition correction proposed earlier by the assignee in Japanese Laid-open Patent Application Hei 6(1994)-17680. In the earlier proposed system illustrated, the STR controller is inserted in series in the fuel injection calculation system and the STR controller operates such that the desired fuel injection amount to be injected in a cylinder becomes equal to the fuel injection amount actually injected in the cylinder. The system parameter estimator estimates the system parameters from the behavior of the actual fuel injection amount calculated from the measured air/fuel ratio. Fuel droplet deposition correction has correction factors A, B prepared beforehand as mapped data which are retrieved from the engine operating parameters (such as the engine coolant water temperature Tw, manifold absolute pressure Pb, engine speed Ne etc). The STR controller receives the estimated system parameters and compensates for the fuel injection amount so as to decrease the difference between the actual deposition and that calculated from the mapped data.

The configuration shown in FIG. 8 was based on the assumption that the desired fuel injection amount was calculated correctly. Because, when the desired value was out of the engine's desired value, the STR controller attempted to converge the actual fuel injection amount to the erroneously determined desired fuel injection amount. As a result, the actual fuel injection amount drifted from that desired by the engine, generating air/fuel ratio spikes. Since the system parameter estimator could not discriminate whether the spikes were due to the drift of the correction factor or due to a disturbance, it had a drawback that the system became unstable or diverged. It therefore became necessary to accurately reflect the canister purge which would affect the desired fuel injection amount calculation.

The third embodiment aims to solve this problem and for that purpose, the STR controller is given the air/fuel ratio as the desired value and is designed to operate such that the measured air/fuel ratio becomes equal to the desired air/fuel ratio. With the arrangement, no matter which spike is generated (due to the deviation from the mapped correction factors or due to a disturbance), the STR controller merely recognizes it as a spike and operates to converge the detected air/fuel ratio to the desired air/fuel ratio. With this arrangement, if the affection of the error due to the disturbance can be reflected in the desired fuel injection amount with high accuracy, the system will be free of unstable or divergent conditions.

The operation of the system according to the third embodiment will be explained with reference to the flowchart of FIG. 7.

The program starts at the first step and proceeds to step S28 in the same manner as the first embodiment and then advances to step S280 in which the correction of the final fuel injection amount Tout(k) by the fuel droplet deposition is conducted. Specifically, this is carried out by correcting the final fuel injection amount Tout(k) with the factors.

Figure 9:
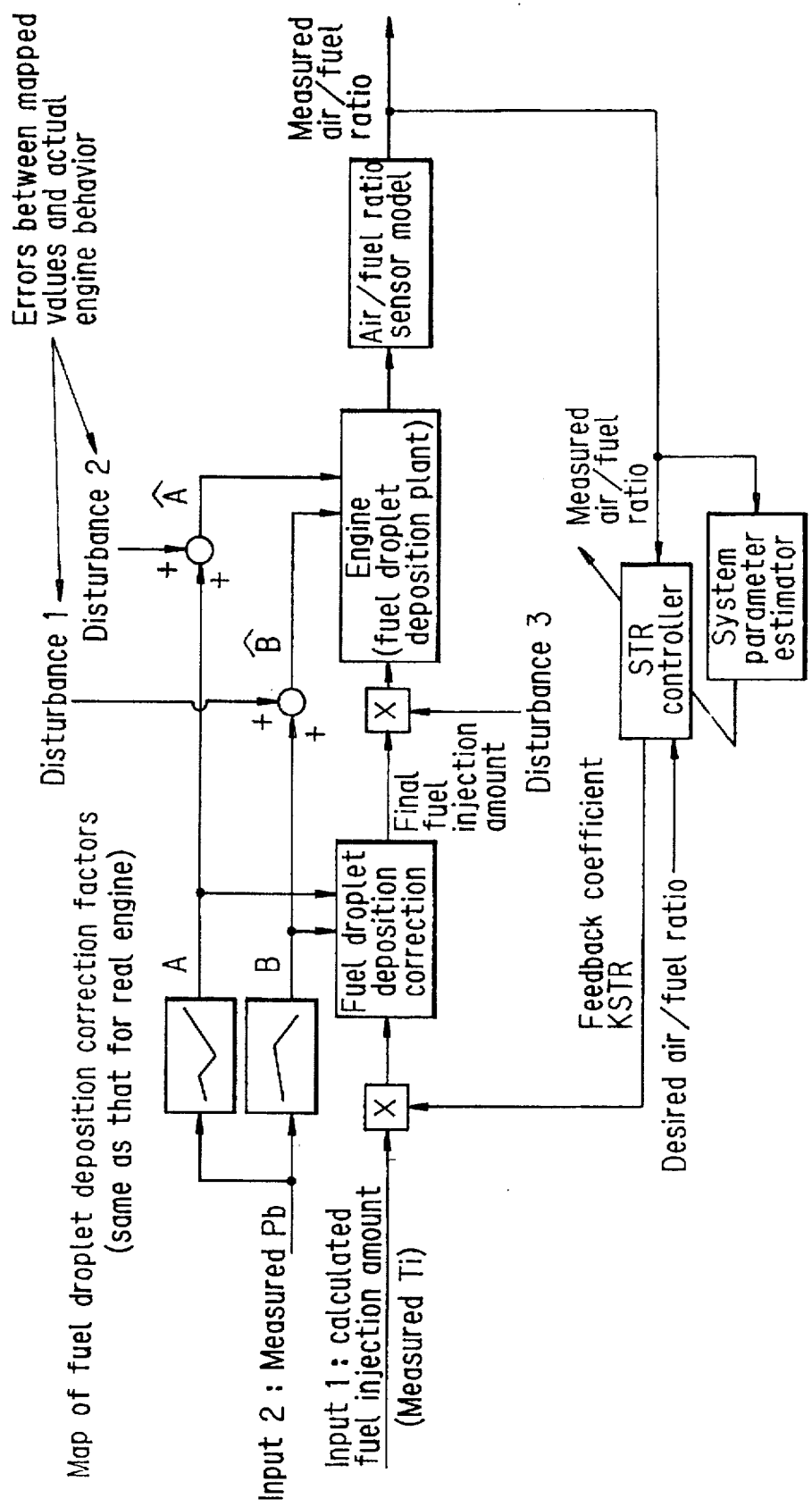
FIG. 9 is a block diagram showing the air/fuel ratio feedback control system for an internal combustion engine used in a simulation for verifying the validity of the system illustrated in FIG. 6.

Now, let us verify the validity of the third embodiment by a simulation. FIG. 9 shows the system used in the simulation. In order to test the performance against disturbances, pseudo-disturbances 1, 2 and 3 which would possibly enter during the actual engine operation were prepared. Disturbances 1 and 2 added to the correction factors A, B are assumed to bring errors between the value corrected by the mapped data and the actual engine behavior (plant). Disturbance 3 is inserted between the fuel droplet deposition correction and the plant as a disturbance due to the canister purge or mapped data error. The correction factor A indicates a proportion of the amount immediately sucked in a cylinder as compared to the total amount injected. The correction factor B indicates the amount that remains on the manifold floor (fuel droplet deposition). Since they were described in the aforesaid earlier application (6-17680) and the gist of the invention does not reside there, no further explanation will be made.

Figure 10:
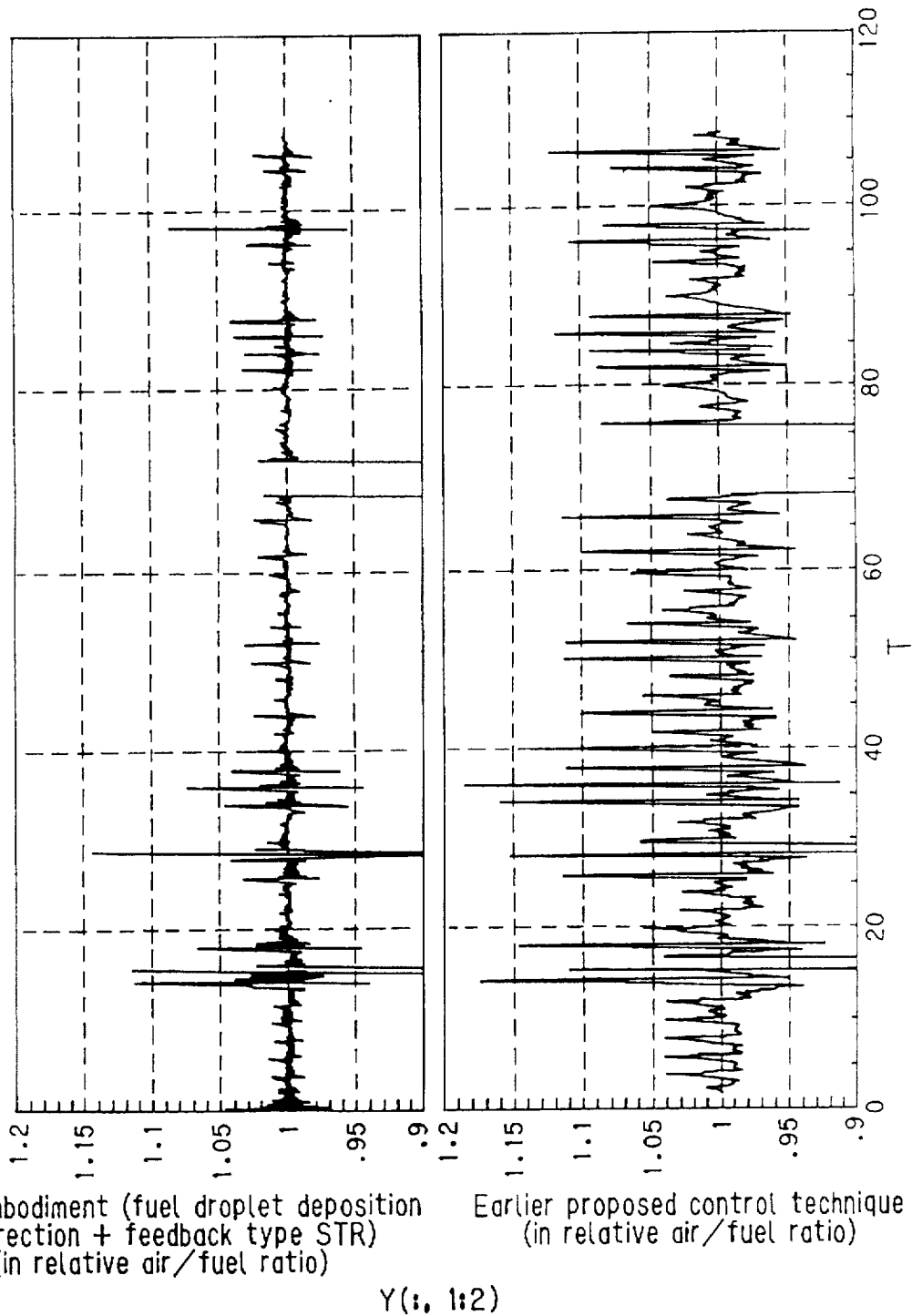
FIG. 10 is a graph showing the result of the simulation.

FIG. 10 shows the simulation result. FIG. 10 illustrates the result of the control according to the third embodiment (shown in FIG. 6) in contrast with the earlier proposed control (shown in FIG. 8). As is apparent from the figure, the air/fuel ratio spikes decrease greatly in the third embodiment configuration and the air/fuel ratios are markedly within a predetermined range centered at 1.0. To be more specific, the earlier proposed system uses the fuel injection amount as the desired value and hence, the desired value drifts due to a disturbance, thereby degrading the control performance.

On the other hand, the third embodiment configuration uses the air/fuel ratio as the desired value, named as "feedback type STR" in the figure, which absorbs disturbances and exhibits excellent control performance. In particular, when the desired air/fuel ratio is the stoichiometric ratio, since the desired value will not be changed frequently, the control stability will further be enhanced. Although the third embodiment configuration is not advantageous in that it can not directly compensate for the error in the mapped correction factors. However, since the deadbeat property, (i.e., convergence will occur within several control cycles provided that the controlled object remains unchanged,) is ensured in the third embodiment configuration, the control performance is improved as proved by the simulation. Incidentally, when the mapped data are used, the third embodiment configuration can compensate for the fuel transport delay to a fair extent.

Figure 11:
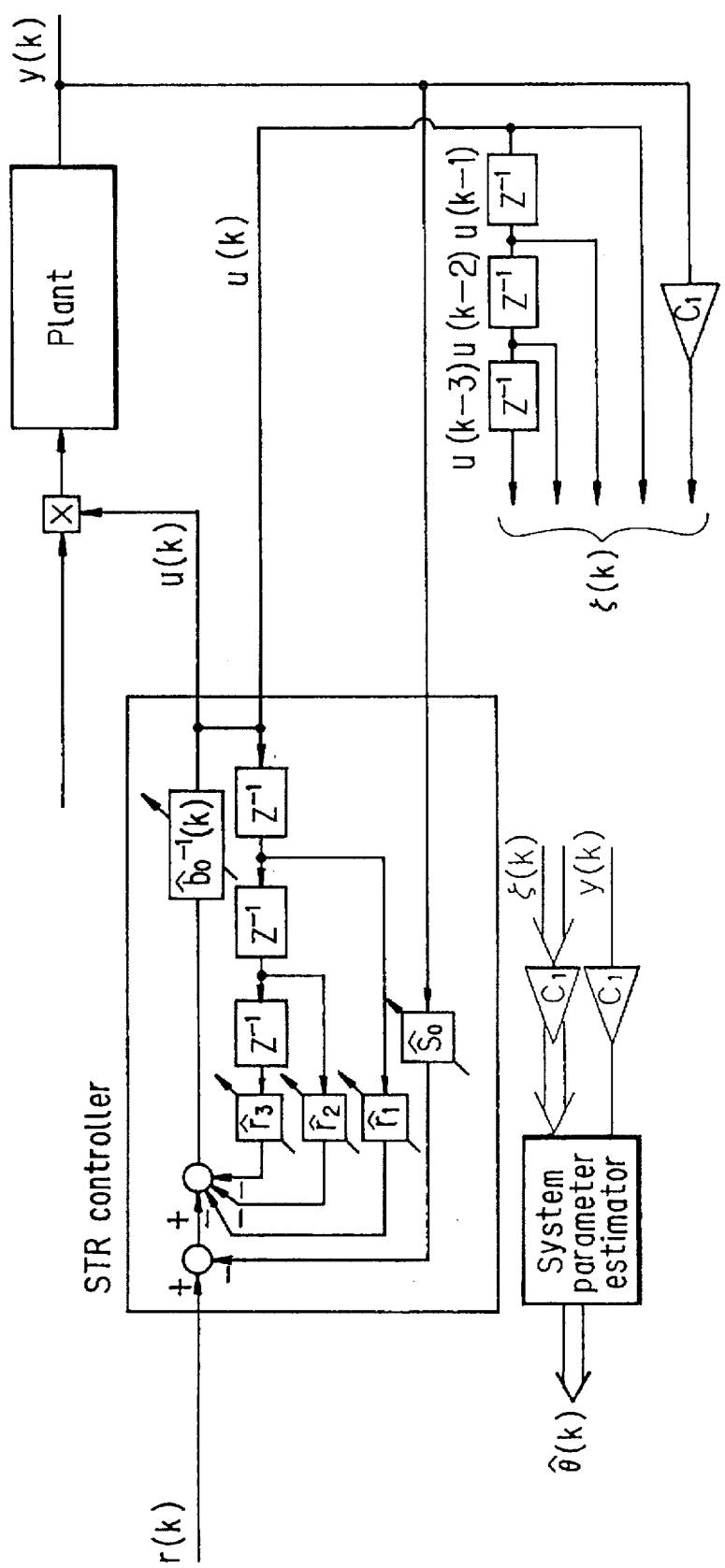
FIG. 11 is a block diagram showing the air/fuel ratio feedback control system for an internal combustion engine according to a fourth embodiment of the invention.

FIG. 11 shows a fourth embodiment of the invention.

In the fourth embodiment, the intermediate values necessary for calculating the system parameters $\hat{\theta}$ are limited to their ranges of change and the system is facilitated to be on a low performance microcomputer with a small word length.

When conducting the calculation of the system parameters $\hat{\theta}$ on a specific digital computer, since the digital computer has a particular word (bit) length such as 4, 8, 16 or 32 bits, variables in the calculation have to be restricted, in some cases, within a predetermined range. In that case, when a variable's least significant bit (LSB) is assigned with a small value so as to enhance calculation accuracy, a possible maximum value of the variable is thereby limited to a certain extent, and hence the range of change of the variable is automatically restricted. If the system parameter estimator is intended to be realized on a digital computer, not all variables for the parameter calculation are free from the problem.

It should be noted that the "variable" or an "intermediate variable" referred to in the specification means all variables calculated finally (or even temporarily) in the adaptive controller such as $\Gamma(k)$, $\Gamma(k-1)\zeta(k-d)$, $\Gamma(k-1)\zeta(k-d)$ $\Gamma^T(k-1)$, $\hat{\theta}^T(k-1)$ $(k-d)$, etc.

When selecting one element $\Gamma_{11}(k)$ (first row, first column) of the gain matrix as the representative of the intermediate variables of the system parameter adjuster, the change of the value is relatively large, and sometimes may range from $4\times10^7$ through $8\times10^8$. In integer calculation, it is difficult for a microcomputer with a small string of bits such as 16-bits to handle such a large value. On the other hand, in order to avoid occurrence of overflowing and to enhance the control accuracy, the variables including the intermediate ones should preferably be assigned with a smaller LSB.

As a result, it is quite difficult to realize the aforesaid adaptive control on a low performance computer with 16 bit length for example. Particularly, since the air/fuel ratio control requires relatively short sampling interval, the difficulty will be increased.

Here, as will be understood from Equation 6, the range within which the intermediate values can possibly change is determined by the input zeta (k) to the system parameter adjuster. Therefore, it is arranged in the fourth embodiment such that, in order to restrict the range of change of the intermediate values, the value zeta (k) is multiplied by a coefficient other than 1 (the coefficient hereinafter referred to as "C1"), and the product is then input to the system parameter estimator.

More specifically, the value $\Gamma(k)$ is in inverse proportion to the square of the coefficient C1, as will be derived out from Equation 6. On the other hand, the system parameters $\hat{\theta}(k)$ (the outputs of the system parameters adjuster) are determined solely by the controlled plant. Therefore, it is apparent in theory that even when the values zeta (k) and y(k) are multiplied by the coefficient C1, the output supplied to the controller remains unchanged. This is illustrated in FIG. 11.

In the fourth embodiment, it is conceived that the intermediate value is in inverse proportion to the square of the value input to the system parameter estimator, and the fourth embodiment is arranged such that the intermediate value is decreased by increasing the input value. With this arrangement, when the LSB is assigned with a small value so as to obtain a desired accuracy in the control, it becomes possible to restrict the range of change of the intermediate values, without increasing bit length, so as not to cause overflow. Thus, it becomes possible to conduct the calculation on a less expensive microcomputer of lesser bit length such as 16-bits. Further, since it becomes possible to calculate at a higher speed because the bit length is small, the disclosed configuration can cope with a control having a short sampling period.

Moreover, it is apparent from the theory that multiplying a coefficient with the input value to the system parameter adjuster does not affect control performance.

Furthermore, the above is based on the variable-gain algorithm or the gradually-decreasing-gain algorithm. In the constant-gain algorithm or the constant-trace algorithm, $\Gamma(k)$ is constant or has a lesser range of change. However, with reference to the intermediate variables other than $\Gamma(k)$, such as $\Gamma(k-1)\zeta(k-d)$, $\hat{\theta}^T(k-1)\zeta(k-d)$ etc, it is alternatively possible to multiply a coefficient to zeta(k-d) so as to vary their ranges of change.

A fifth embodiment of the invention will next be explained.

Figure 12:
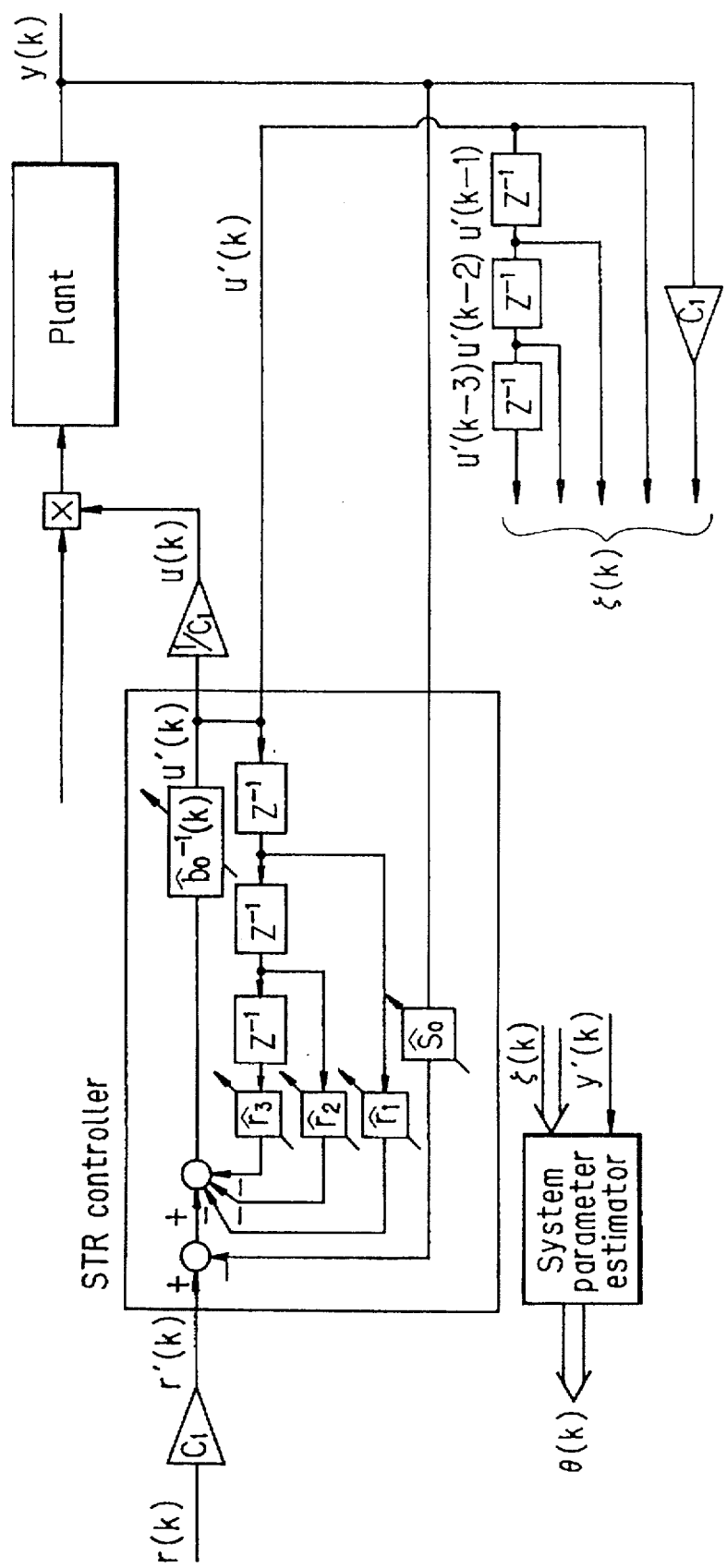
FIG. 12 is a block diagram showing the air/fuel ratio feedback control system for an internal combustion engine according to a fifth embodiment of the invention.

FIG. 12 is a block diagram similar to FIG. 11 but showing the fifth embodiment of the invention.

In the fifth embodiment, the input r(k) to be supplied to the STR controller is multiplied by the coefficient C1 to obtain r'(k), and the value r'(k) is inputted into the controller. Then the controller's output u'(k) is divided by the coefficient C1 to obtain the value u(k) which is inputted into the plant. Further, the plant's output y(k) is multiplied by the coefficient C1 to obtain y'(k), and the value y'(k) is inputted into the system parameter estimator.

Here, the value y'(k) is the product of y(k) and C1 as just mentioned, and the controller's output u'(k) becomes C1 times greater than u(k) in the fourth embodiment illustrated in FIG. 11. Accordingly, the values zeta (k) and y'(k) become the same values as those shown in FIG. 12. Similarly, since the value u(k) inputted into the plant has been multiplied by the value 1/C1, the value becomes the same as that illustrated in FIG. 12. Thus, the configuration illustrated in FIG. 12 has the same effect as that illustrated in FIG. 11.

It should be noted that the modification of the fourth embodiment will not be limited to the fifth embodiment and many other modifications will be possible. What is important is that only the value inputted into the system parameter estimator should be multiplied by the coefficient, while the value to be inputted into the plant is kept as it originally is.

A sixth embodiment of the invention will next be explained.

Figure 13:
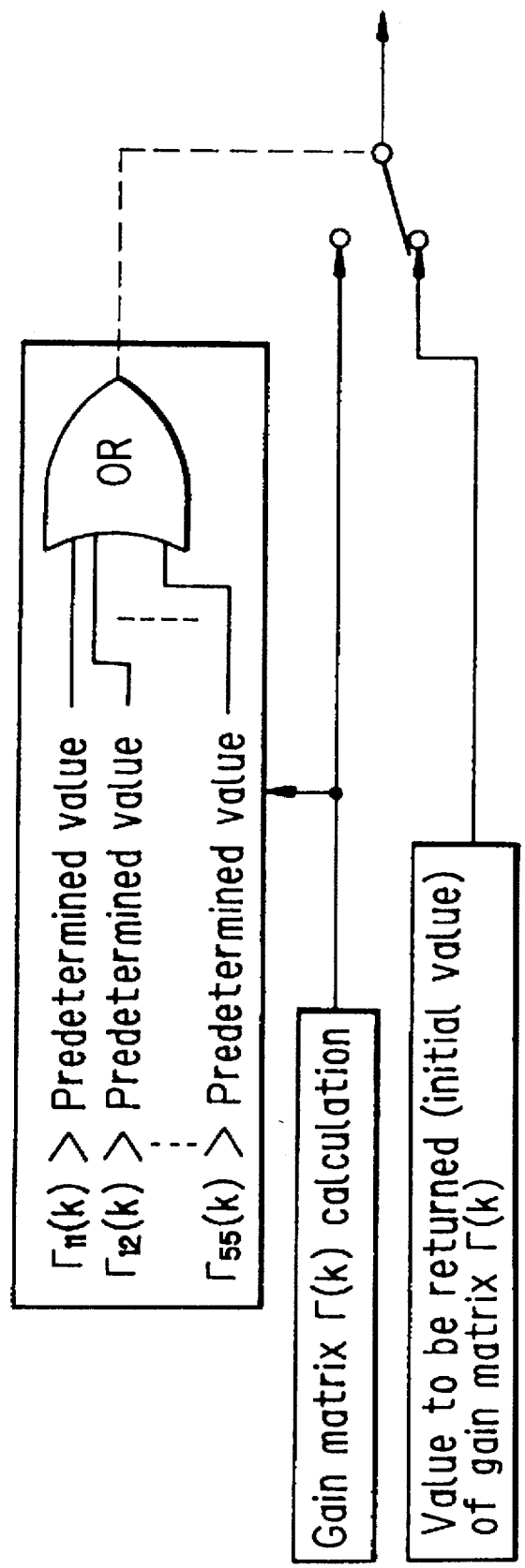
FIG. 13 is a block diagram showing a part of the air/fuel ratio feedback control system for an internal combustion engine according to a sixth embodiment of the invention.
Figure 14:
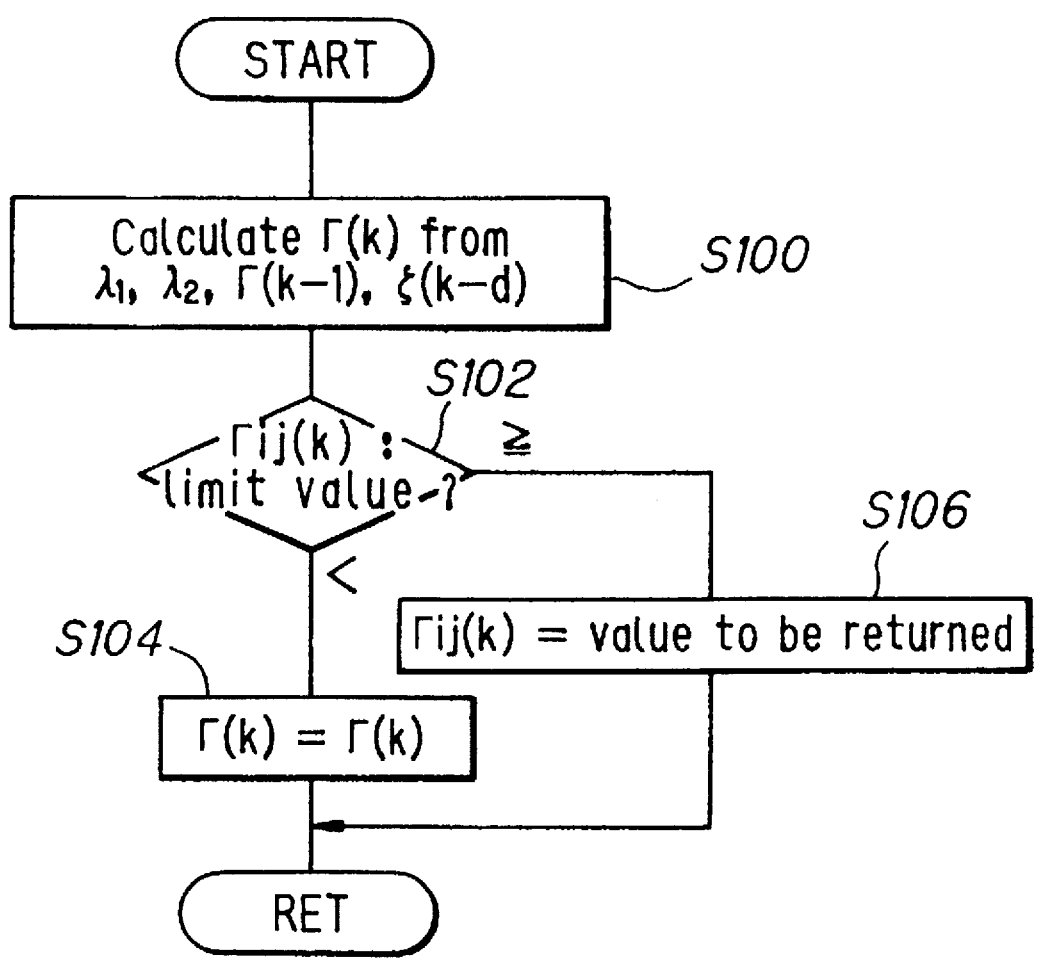
FIG. 14 is a flowchart showing the operation of the system illustrated in FIG. 13.

FIG. 13 is a block diagram showing the configuration of the sixth embodiment and FIG. 14 is a flowchart showing the operation of the configuration of the sixth embodiment.

Since it has been found possible in the foregoing to decrease the intermediate values such as $\Gamma(k)$, each variable's LSB is then assigned with a value such that no overflow would occur even if a 16-bit integer calculation is carried out. This was verified by a simulation. From the result of the simulation, however, it was found that the control performance degraded. This was because, whichever configuration illustrated in FIG. 11 or 12 was adopted to restrict the maximum value of the intermediate value, the least value was also decreased, making it impossible to assign a sufficiently small value to the LSB, whereby degrading control performance.

In the constant-gain algorithm or the constant-trace algorithm, this will be not a serious problem since the gain matrix $\Gamma(k)$ is either constant or small in its range of change. In the gradually-decreasing-gain algorithm or the variable-gain algorithm, since $\Gamma(k)$ is in inverse proportion to the square of zeta (k), it might occasionally become impossible to decrease the maximum/minimum value of $\Gamma(k)$, depending on the change ratio or maximum/minimum value of r(k). As a result, even if the LSB is assigned a small value, overflow might occur if the bit length is restricted to a certain extent.

It would be possible to pass the value $\Gamma(k)$ through a limiter so as to restrict it to a certain limit. However, in that case, the value $\hat{\theta}(k)$ would diverge, rather than converge.

The sixth embodiment aims to solve this problem, and for that purpose it is arranged such that the range of $\Gamma(k)$ is further restricted.

Explaining this with reference to the flowchart of FIG. 14, the program begins at S100 in which the value $\Gamma(k)$ is calculated according to Equation 6. The program then proceeds to S102 in which one element of the gain matrix $\Gamma_{ij}(k)$ is compared with a limit value. If it is less than the limit value, the program passes to S104 in which the calculated value is left as it is. If it is found that the value is not less than the limit value, the program advances to S106, in which the value $\Gamma_{ij}(k)$ is replaced with a value (such as its initial value) to be returned. It can be easily understood that returning to the initial value prevents diversion, from the fact that the constant gain algorithm does not diverge; nor does divergence occur in the gradually-decreasing gain algorithm or the variable gain algorithm if $\Gamma(k)$ is started from the initial value at the beginning.

Since the sixth embodiment is arranged thus, if the LSB is assigned with a small value so as to maintain control accuracy, the bit length need not be increased, and hence the range of change of the intermediate variables is more strictly restricted such that no overflow occurs. It thus becomes possible to conduct the adaptive control using a short sampling period on a less expensive and lesser-bit-length microcomputer using the gradually-decreasing-gain algorithm or the variable-gain algorithm. Although only the matrix $\Gamma(k)$ is selected as a representative of the intermediate variables, the same will, needless to say, also be applied to the other variables.

Figure 15:
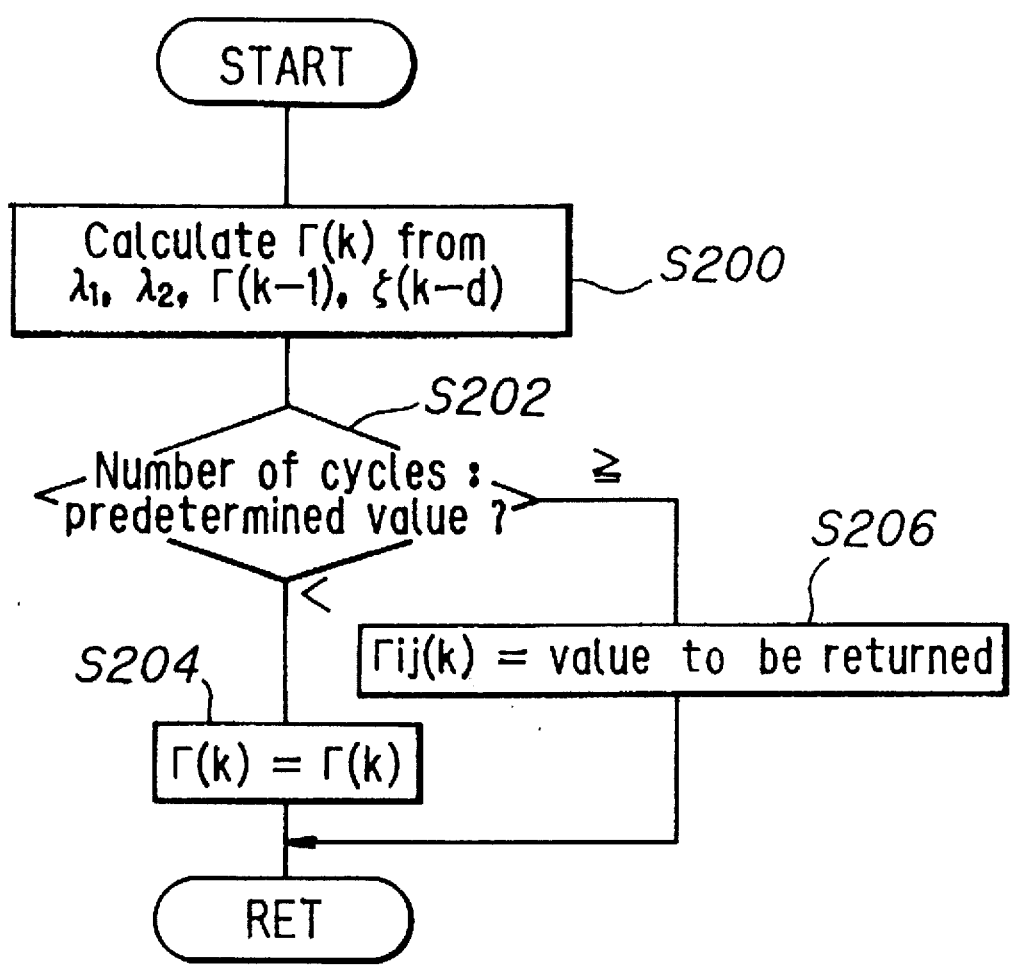
FIG. 15 is a flowchart, similar to FIG. 14, but showing the operation of the air/fuel ratio feedback control system for an internal combustion engine according to a seventh embodiment of the invention.

FIG. 15 is a flowchart similar to FIG. 14 but showing a seventh embodiment of the invention.

In the embodiment, the element of the matrix $\Gamma_{11}(k)$ is automatically returned to the returning value (the initial value) at every predetermined control cycle, e.g., 3, irrespective of whether or not it actually exceeds the limit value as shown in steps S200 through S206. It should be noted that the predetermined value may be any value that is not less than 2. It should further be noted that the predetermined value is able to be varied depending on the operating condition of the plant, the exception being variance at every cycle (since that would become equivalent to the constant-gain algorithm).

Figure 16:
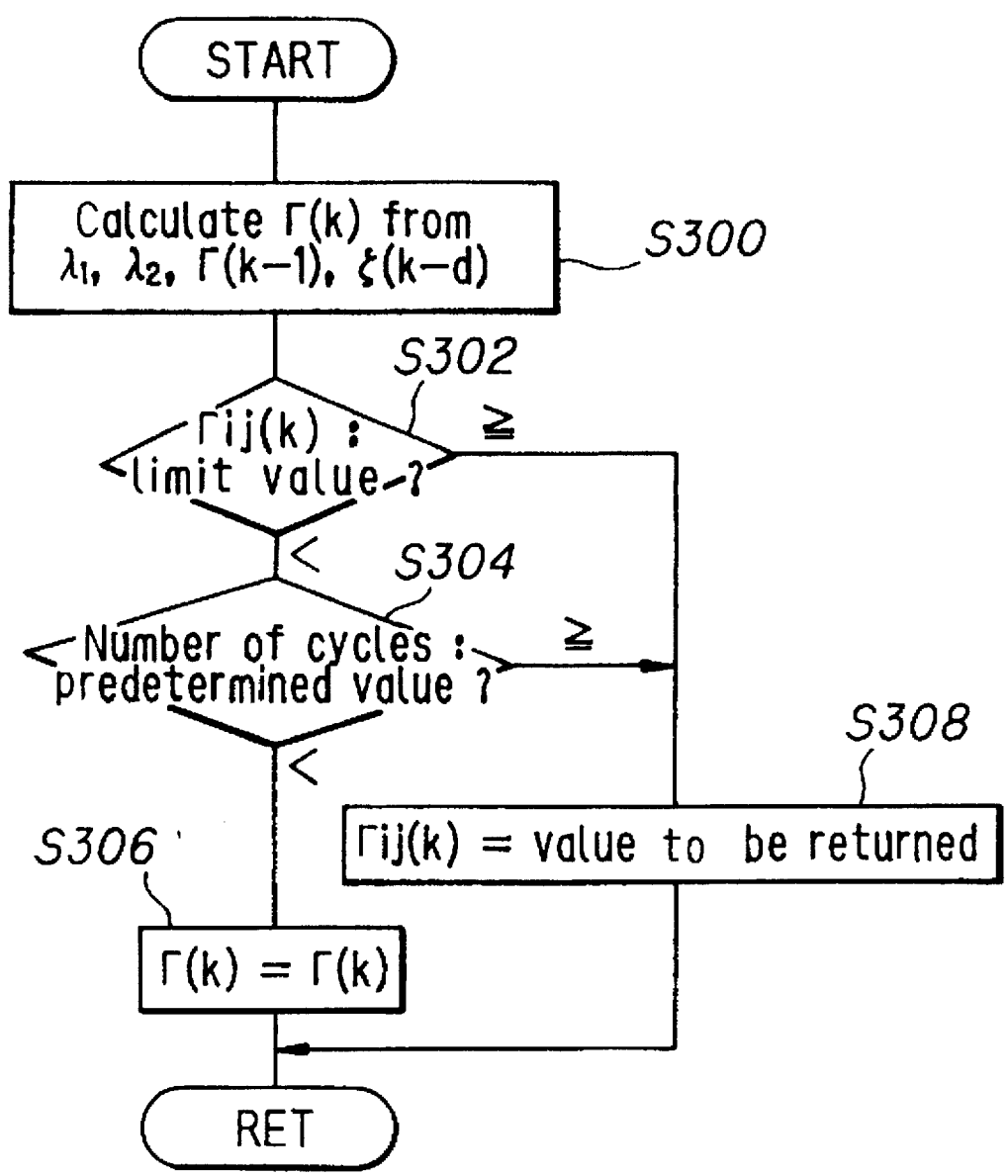
FIG. 16 is a flowchart, similar to FIG. 14, but showing the operation of the air/fuel ratio feedback control system for an internal combustion engine according to an eighth embodiment of the invention.

FIG. 16 is a flowchart similar to FIG. 14 but showing an eighth embodiment of the invention.

In the eighth embodiment, the value $\Gamma_{11}(k)$ is returned to the returning value (the initial value) when the value $\Gamma_{11}(k)$ becomes equal to or greater than the limit value (80 in this embodiment), or when the number of control cycles reaches the predetermined value (7 in this embodiment) as disclosed in steps S300 through S308. The effect of the eighth embodiment is the same as in the foregoing embodiments.

In the foregoing fourth through eighth embodiments, the fourth (or the fifth) embodiment and the sixth (or the seventh or eighth) embodiment can be used independently. Alternatively, after the range of change of intermediate values has been restricted by using the fourth (or the fifth) embodiment, it is alternatively possible to further restrict the range by using the sixth (or the seventh or eighth) embodiment.

In the sixth and eighth embodiments, although the value $\Gamma_{ij}(k)$ is returned to the returning value (the initial value) when it becomes equal to or greater than the limit value, it is alternatively possible to return a value $\Gamma_{pq}(k)$ (where i≠p or j≠q) to the returning value (the initial value) when the value $\Gamma_{ij}(k)$ is equal to or greater than the limit value. It is further possible to return not only one element, but also two or more elements of the value $\Gamma(k)$ when the value $\Gamma_{ij}(k)$ becomes equal to or greater than the limit value. Further, it is alternatively possible to set limit values for the separate elements of the value.

In the sixth embodiment and on, although the value is returned to the initial value, it is alternatively possible to return it to an appropriate value other than the initial value.

In the foregoing first through eighth embodiments, although the invention has been described with reference to STR, the same may also be applied to MRACS.

The present invention has thus been shown and described with reference to specific embodiments. However, it should be noted that the present invention is in no way limited to the details of the described arrangements and that changes and modifications can be made without departing from the scope of the appended claims.

What is claimed is:

1. A system for controlling an air/fuel ratio of an internal combustion engine, comprising:

engine operating condition detecting means for detecting engine operating conditions including at least engine speed and engine load;

fuel injection amount calculating means which calculates a basic fuel injection amount to be supplied to said engine based on at least the detected engine speed and engine load;

air/fuel ratio detecting means for detecting an air/fuel ratio in exhaust gas generated by said engine;

feedback loop means coupled to said fuel injection amount calculating means, and having an adaptive controller with a system parameter estimator which estimates system parameters, said adaptive controller receiving a desired air/fuel ratio value and a controlled variable which is obtained based at least on the detected air/fuel ratio and calculating a feedback correction coefficient using a law expressed in recurrence formula to correct the basic fuel injection amount at least using said system parameters to bring the controlled variable to the desired air/fuel ratio value;

correcting means for correcting said basic fuel injection amount by said feedback correction coefficient; and fuel injection means coupled to said correcting means for injecting fuel into said engine based on the corrected fuel injection amount.

2. A system according to claim 1, wherein said feedback loop means calculates the feedback correction coefficient at least using said system parameters to bring the detected air/fuel ratio to a desired air/fuel ratio.

3. A system according to claim 2, wherein said system parameter estimator estimates said system parameters based on a law expressed in a recurrence formula.

4. A system according to claim 1, wherein said feedback correction coefficient is a predetermined value that is multiplied by said basic fuel injection amount.

5. A system according to claim 4, wherein said system parameter estimator estimates said system parameters based on a law expressed in a recurrence formula.

6. A system according to claim 1, further including:

fuel droplet deposition correction means for correcting said corrected fuel injection amount by an amount of fuel remaining on a floor of an intake manifold.

7. A system according to claim 6, wherein said system parameter estimator is provided with a limiter means which establishes a limit for at least one of variables necessary for estimating said system parameters to a predetermined value.

8. A system according to claim 7, wherein said at least one of variables is at least one element of a gain matrix necessary for estimating said system parameters.

9. A system according to claim 8, wherein said limiter means establishes the limit such that said at least one element of said gain matrix is replaced with a predetermined value when said at least one element exceeds the limit.

10. A system according to claim 7, wherein said limiter means establishes the limit such that said at least one element of said gain matrix or a past value thereof is replaced with a predetermined value when said at least one element of said gain matrix or said past value thereof becomes not less than the limit.

11. A system according to claim 7, wherein said limiter means establishes the limit and said at least one element of said gain matrix or a past value thereof is replaced with a predetermined value when a number of control cycles exceeds the limit.

12. A system according to claim 6, wherein at least one of inputs to said system parameter estimator including the controlled variable are multiplied by a coefficient other than 1.

13. A system according to claim 6, wherein all inputs to said system parameter estimator including the controlled variable are multiplied by a coefficient other than 1.

14. A system according to claim 6, wherein an input to said adaptive controller made of said desired value and an output made of the controlled variable obtained at least based on the detected air/fuel ratio output from said engine to be inputted into said system parameter estimator are multiplied by a coefficient other than 1, while the feedback correction coefficient input to said engine is multiplied by the reciprocal of said coefficient.

15. A system according to claim 14, wherein said input to said adaptive controller and said output from said engine are multiplied by the same coefficient.

16. A system according to claim 1, wherein said system parameter estimator estimates said system parameters based on a law expressed in a recurrence formula.

17. A system according to claim 1, wherein said system parameter estimator is provided with a limiter means which establishes a limit for at least one of variables necessary for estimating said system parameters to a predetermined value.

18. A system according to claim 17, wherein said at least one of variables is at least one element of a gain matrix necessary for estimating said system parameters.

19. A system according to claim 18, wherein said limiter means establishes the limit such that said at least one element of said gain matrix is replaced with a predetermined value when said at least one element exceeds the limit.

20. A system according to claim 17, wherein said limiter means establishes the limit such that said at least one element of said gain matrix or a past value thereof is replaced with a predetermined value when said at least one element of said gain matrix or said past value thereof becomes not less than the limit.

21. A system according to claim 17, wherein said limiter means establishes the limit and said at least one element of said gain matrix or a past value thereof is replaced with a predetermined value when a number of control cycles exceeds the limit.

22. A system according to claim 1, wherein at least one of inputs to said system parameter estimator including the controlled variable are multiplied by a coefficient other than 1.

23. A system according to claim 1, wherein all inputs to said system parameter estimator including the controlled variable are multiplied by a coefficient other than 1.

24. A system according to claim 1, wherein an input to said adaptive controller made of said desired value and an output made of the controlled variable obtained at least based on the detected air/fuel ratio output from said engine to be inputted into said system parameter estimator are multiplied by a coefficient other than 1, while the feedback correction coefficient input to said engine is multiplied by the reciprocal of said coefficient.

25. A system according to claim 24, wherein said input to said adaptive controller and said output from said engine are multiplied by the same coefficient.

26. A system for controlling an air/fuel ratio of an internal combustion engine, comprising:

engine operating condition detecting means for detecting engine operating conditions including at least engine speed and engine load;

fuel injection amount calculating means which calculates a fuel injection amount to be supplied to said engine;

air/fuel ratio detecting means for detecting an air/fuel ratio in exhaust gas generated by said engine;

an adaptive controller with a system parameter estimator which estimates a system parameter such that an error between a controlled variable and a desired value decreases, said adaptive controller calculating a feedback coefficient using a law expressed in recurrence formula at least using said system parameter;

correcting means for correcting said fuel injection amount by said feedback coefficient; and fuel injection means, coupled to said correcting means, for injecting fuel into said engine based on the corrected fuel injection amount, wherein said system parameter estimator is provided with a limiter which limits a variable necessary for estimating said system parameter to a predetermined value; and wherein said variable is at least one element of a gain matrix necessary for estimating said system parameter.

27. A system for controlling an air/fuel ratio of an internal combustion engine, comprising:

engine operating condition detecting means for detecting engine operating conditions including at least engine speed and engine load;

fuel injection amount calculating means which calculates a fuel injection amount to be supplied to said engine;

air/fuel ratio detecting means for detecting an air/fuel ratio in exhaust gas generated by said engine;

an adaptive controller with a system parameter estimator which estimates a system parameter such that an error between a controlled variable and a desired value decreases, said adaptive controller calculating a feedback coefficient at least using said system parameter;

correcting means for correcting said fuel injection amount by said feedback coefficient; and fuel injection means, coupled to said correcting means, for injecting fuel into said engine based on the corrected fuel injection amount, wherein said system parameter estimator is provided with a limiter which limits a variable necessary for estimating said system parameter to a predetermined value; and wherein said limiter replaces at least one element of a gain matrix or a past value thereof with a predetermined value when said at least one element of said gain matrix or said past value thereof becomes not less than a limit value.

28. A system for controlling an air/fuel ratio of an internal combustion engine, comprising:

engine operating condition detecting means for detecting engine operating conditions including at least engine speed and engine load;

fuel injection amount calculating means which calculates a fuel injection amount to be supplied to said engine;

air/fuel ratio detecting means for detecting an air/fuel ratio in exhaust gas generated by said engine;

an adaptive controller with a system parameter estimator which estimates a system parameter such that an error between a controlled variable and a desired value decreases, said adaptive controller calculating a feedback coefficient at least using said system parameter;

correcting means for correcting said fuel injection amount by said feedback coefficient; and fuel injection means, coupled to said correcting means, for injecting fuel into said engine based on the corrected fuel injection amount, wherein said system parameter estimator is provided with a limiter which limits a variable necessary for estimating said system parameter to a predetermined value; and wherein said limiter replaces at least one element of a gain matrix or a past value thereof with a predetermined value at every predetermined control cycles.

29. A system for controlling an air/fuel ratio of an internal combustion engine, comprising:

engine operating condition detecting means for detecting engine operating conditions including at least engine speed and engine load;

fuel injection amount calculating means which calculates a fuel injection amount to be supplied to said engine;

air/fuel ratio detecting means for detecting an air/fuel ratio in exhaust gas generated by said engine;

an adaptive controller with a system parameter estimator which estimates a system parameter such that an error between a controlled variable and a desired value decreases, said adaptive controller calculating a feedback coefficient at least using said system parameter;

correcting means for correcting said fuel injection amount by said feedback coefficient; and fuel injection means, coupled to said correcting means, for injecting fuel into said engine based on the corrected fuel injection amount, wherein all inputs to said system parameter estimator are multiplied by a same coefficient other than 1.

30. A system for controlling an air/fuel ratio of an internal combustion engine, comprising:

engine operating condition detecting system for detecting engine operating conditions including at least engine speed and engine load;

fuel injection amount calculating means which calculates a fuel injection amount to be supplied to said engine;

air/fuel ratio detecting means for detecting an air/fuel ratio in exhaust gas generated by said engine;

an adaptive controller with a system parameter estimator which estimates a system parameter such that an error between a controlled variable and a desired value decreases, said adaptive controller calculating a feedback coefficient at least using said system parameter;

correcting means for correcting said fuel injection amount by said feedback coefficient; and fuel injection means, coupled to said correcting means, for injecting fuel into said engine based on the corrected fuel injection amount, wherein an input to said adaptive controller and an output from said engine to be input into said system parameter estimator are multiplied by a coefficient other than 1, while an input to said engine is multiplied by the reciprocal of said feedback coefficient.

* * * * *